Jan. 20, 1953 — W. M. VOYCE — 2,625,999
VARIABLE PITCH PROPELLER
Filed June 18, 1948 — 2 SHEETS—SHEET 1
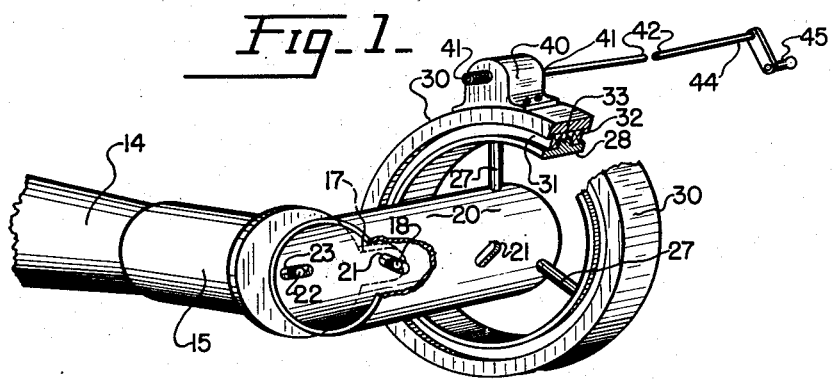
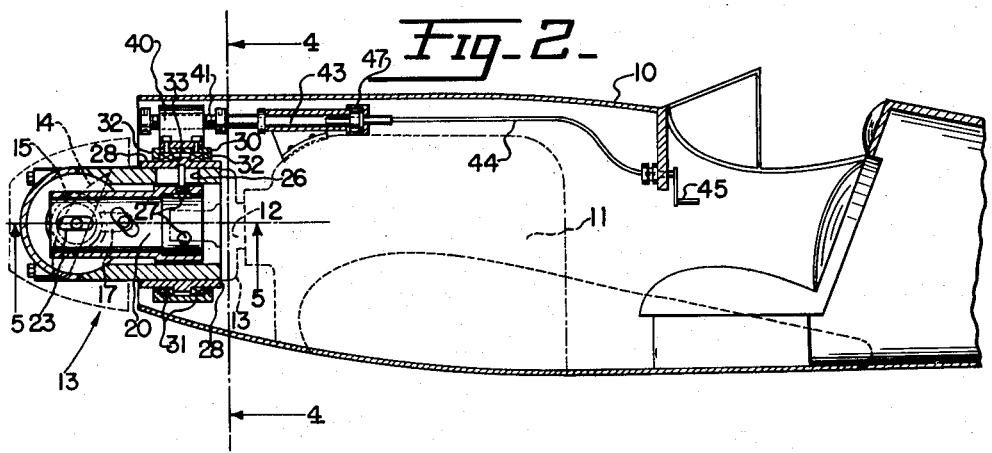
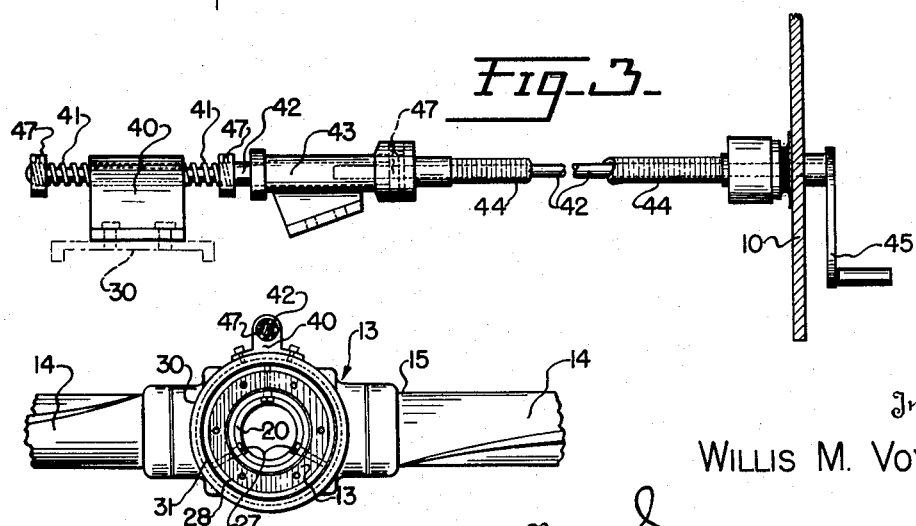
Inventor.
WILLIS M. VOYCE.
By Harvey J. O'Connell
attorneys.

Jan. 20, 1953 W. M. VOYCE 2,625,999
VARIABLE PITCH PROPELLER
Filed June 18, 1948 2 SHEETS—SHEET 2
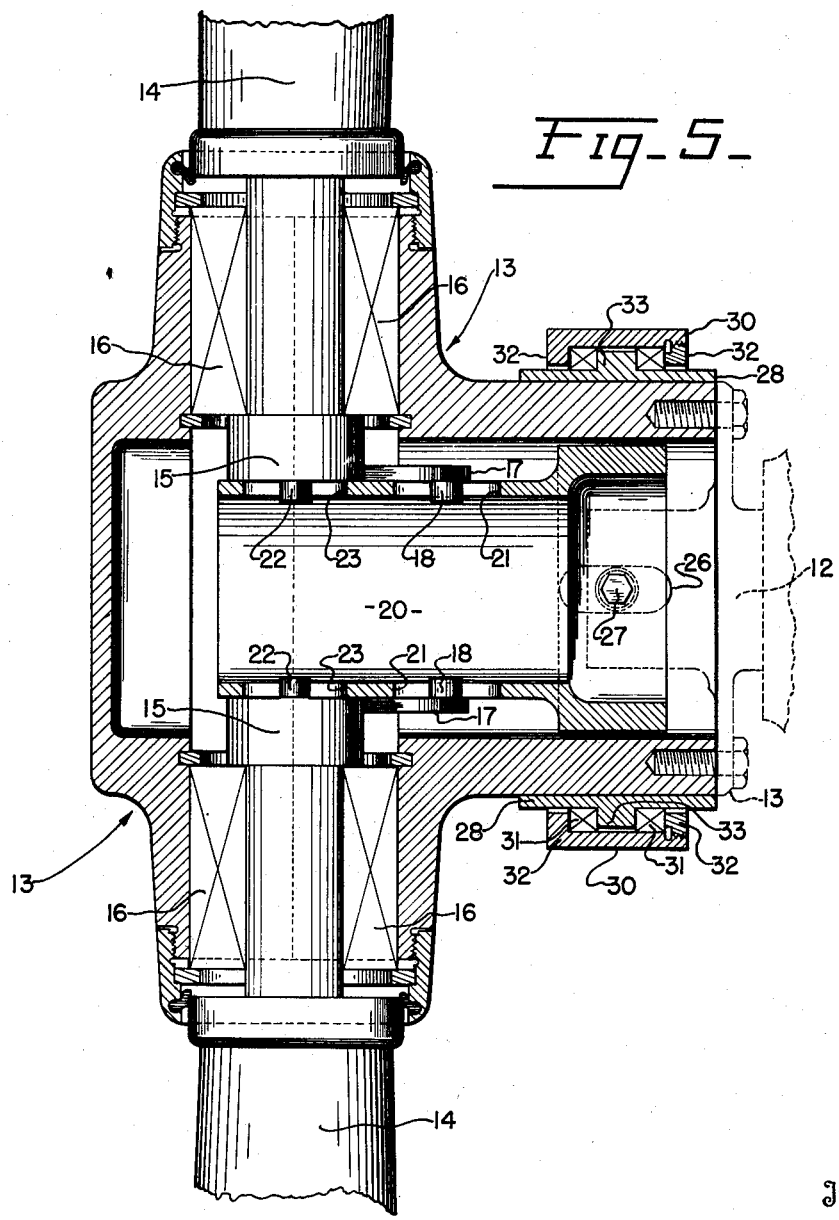
Inventor,
WILLIS M. VOYCE.
By Harvey J. O'Connell
Attorneys.

Patented Jan. 20, 1953

2,625,999

UNITED STATES PATENT OFFICE 2,625,999

VARIABLE PITCH PROPELLER

Willis M. Voyce, Johnstown, Pa.

Application June 18, 1948, Serial No. 33,698

1 Claim. (Cl. 170—160.47)

This invention relates to variable pitch propellers which are particularly adaptable for use on aircraft.

The optimum pitch or angularity of the blades of a propeller on an aircraft varies in accordance with flight conditions such as attitude of the airplane and air density. Another factor of importance is that an internal combustion engine must be operated at its rated speed to develop its rated horsepower output. It is therefore desirable to keep the engine running at its optimum speed under all flight conditions. This may be accomplished by varying the pitch of the propeller in accordance with variations of airplane attitude and air density so that the load on the engine remains constant and allows the engine to work at its optimum speed.

There are a number of variable pitch propellers in use on military and commercial aircraft, but they are so heavy, complicated, and expensive as to prohibit their use on other types of aircraft. It is, therefore, an object of this invention to provide a simple and effective variable pitch propeller which is relatively easy and economical to manufacture.

It is another object to provide a variable pitch propeller which is manually controllable by the pilot when the airplane is in flight or at rest.

It is a further object to provide a variable pitch propeller which, compared with a constant pitch propeller, adds little to the weight of the aircraft.

It is a further object to provide a variable pitch propeller adjustable over a continuous range of values.

These and many other objects of the invention will be apparent to those skilled in the art from the following description taken in conjunction with the appended drawings of one embodiment of the invention, wherein:

Fig. 1 is a fragmentary perspective view of a propeller illustrating the application of the invention, parts of the device being broken away to disclose details;

Fig. 2 is a fragmentary longitudinal sectional view of an aircraft fuselage illustrating the application of my invention in the forepart of the fuselage;

Fig. 3 is a detail enlarged fragmentary elevational view of the means for controlling the propeller pitch from the pilot's cockpit;

Fig. 4 is a vertical sectional view taken transversely of the airplane on the line 4—4 of Fig. 2 and looking in the direction of the arrows; and Fig. 5 is a fragmentary horizontal sectional view taken on the line 5—5 of Fig. 2 looking in the direction of the arrows and showing the application of the invention to a pair of propellers.

Referring now in greater detail to the drawings, airplane 10 has engine 11 driving propeller shaft 12. Propeller hub assembly 13 is rigidly secured to the propeller shaft 12 and carries a plurality of propeller blades 14. The stub ends 15 of the propeller blades are journaled at 16 in the hub assembly 13 so that the pitch of the propeller blades can be varied by rotating the stub ends 15. Extending radially from the stub end of each propeller blade is a lever arm 17 provided with an eccentric pin 18. A cylindrical member 20 is disposed coaxially within the hub 13 and is provided with an angularly disposed slot 21 for each propeller blade, the eccentric pin 18 of the corresponding propeller blade being disposed in the slot 21. The stub end 15 of each propeller is also provided with a coaxial guide pin 22 engaged with a corresponding longitudinally disposed slot 23 in the cylindrical member 20. The cylindrical member 20 is thus free to shift axially within the hub 13, the limits of movement being determined by the length of longitudinal slots 23. It is to be noted that while cylindrical member 20 is permitted to move axially by a limited amount, it is made to rotate with the hub 13. The hub 13, the propeller blades 14 and the cylindrical member 20 are all driven by the propeller shaft 12 of the airplane engine.

The hub 13 is provided with three longitudinal slots 26 and the cylindrical member 20 is provided with three radially extending braces 27 which extend through the slots 26 and engage an inner ring collar 28 disposed to reciprocate axially on the exterior of the hub 13. In other words, cylindrical member 20 is rigidly secured to inner ring collar 28 by means of radial braces 27. Inner ring collar 28, therefore, rotates with the hub 13 when the latter is driven by the propeller shaft 12. The length of the longitudinal slots 26 corresponds with the length of the longitudinal slots 23 on the cylindrical member 20.

A bearing collar 30 is disposed around the outside of inner ring collar 28 and is prevented from rotating, as will be described. Bearing means 31 is provided between the non-rotating bearing collar 30 and the rotating inner ring collar 28. The bearing means 31 may be in the form of rings of soft metal, roller bearings or ball bearings. It will be noted that a bearing race is provided by the annular flanges 32 on bearing collar 30 and an annular flange 33 on inner ring collar 28.

Bearing collar 30 is rigidly secured to a worm block 40, which in turn is engaged by a worm screw 41 connected to one end of a shank 42. The worm screw 41 is journaled in a mounting bracket 43 which is bolted to the engine 11 or an appropriate part of the airplane frame. The shank 42 is connected by means of a flexible cable 44 to a crank handle 45 mounted in the cockpit of the airplane for convenient manipulation by the pilot.

When it is desired, in the operation of the invention, to vary the pitch of the propeller blades 14, the pilot turns the crank handle 45 in the desired direction, thereby rotating worm screw 41. Since the worm screw is constrained against axial movement by means of mounting bracket 43, rotation of the worm screw causes axial movement therealong of the worm block 40. Because the worm block 40 is secured to the non-rotating bearing collar 30, the bearing collar is likewise shifted axially, taking the rotating inner ring collar 28 and cylindrical member 20 with it. As the cylindrical member 20 moves axially, the eccentric pins 18 are forced along in the angularly disposed slots 21, causing rotation of the propeller blades about their axes, with the result that the pitch of the propellers is varied. It is apparent that the pitch of the propeller may be increased or decreased, at the will of the pilot, by turning crank arm 45 in the appropriate direction.

Means are provided for adapting the invention to application on different aircraft as is shown to advantage in Figure 3. The shank 42 of the worm screw 41 is journaled in mounting bracket 43, and the limits of axial movement of the shank 42 is determined by collars 47 and which may be adjusted in position on the shank 42 by set screws or other appropriate means. By adjusting the positions of these collars 47, the amount of propeller pitch change can be pre-set to provide for the desired range of pitch values. It is also possible by these means to adapt the invention to various airplane engine and propeller combinations having different dimensional relationships.

It is apparent from the foregoing that the pilot of an aircraft equipped with my invention can readily adjust the pitch of the propellers in order to provide for variations in flight conditions such as attitude of the aircraft and air densities. For example, during take-off and climbing conditions, the pitch will be set at a reduced value to allow the engine to rotate at its maximum speed in order to provide for the development of maximum horsepower. After the aircraft has risen, the pilot will increase the pitch of the propeller so that the propeller will take a larger "bite" in the thinner air, thereby utilizing the horsepower of the engine without over-speeding the engine.

While the invention has been described in detail in its presently preferred embodiment, it will of course be understood that such has been done for purposes of illustration and not by way of limitation, and therefore, only such limitations are to be imposed thereon as may reasonably come within the scope of the appended claim.

I claim:

Apparatus for varying the pitch of the blades of a variable pitch propeller of the type embodying propeller blades operatively associated with a rotatable hub, which comprises a slidable cylinder mounted within the hub to rotate therewith and move axially relative thereto, an inner ring collar mounted exteriorly of the hub and connected with the cylinder to rotate and move axially therewith, an outer collar concentric to and engaged with the inner ring collar, a worm block secured to the outer collar, a worm screw threadedly engaged with the worm block and cooperative therewith to axially shift the collars and cylinder, a mounting bracket in which the worm screw is journaled for rotative and longitudinal movements, and stops adjustable on the worm screw for abutting engagement with the mounting bracket whereby the amount of propeller pitch change to be effected by the axial movement of said cylinder and collars may be preset.

WILLIS M. VOYCE.

REFERENCES CITED

The following references are of record in the file of this patent:

UNITED STATES PATENTS

| Number | Name | Date |
|---|---|---|
| 1,839,895 | Rossi | Jan. 5, 1932 |
| 1,857,319 | Monroe | May 10, 1932 |
| 1,891,384 | Gillis et al. | Dec. 20, 1932 |
| 1,977,077 | Martens et al. | Oct. 16, 1934 |
| 2,054,810 | Gaba | Sept. 22, 1936 |
| 2,225,209 | Dewey | Dec. 17, 1940 |
| 2,437,810 | Earley et al. | Mar. 16, 1948 |

FOREIGN PATENTS

| Number | Country | Date |
|---|---|---|
| 24,150 | Great Britain | Nov. 6, 1903 |
| 21,934 | Great Britain | Oct. 27, 1905 |